(12) United States Patent
Carella

(10) Patent No.: US 8,109,159 B1
(45) Date of Patent: Feb. 7, 2012

(54) INSTRUMENTATION INSTALLATION TOOL FOR A PRESSURE VESSEL TEST RIG

(75) Inventor: John A Carella, Jupiter, FL (US)

(73) Assignee: Turbine Technologies, Inc., Jupiter, FL (US)

( * ) Notice: Subject to any disclaimer, the term of this patent is extended or adjusted under 35 U.S.C. 154(b) by 487 days.

(21) Appl. No.: 12/489,765

(22) Filed: Jun. 23, 2009

(51) Int. Cl.
*G01M 99/00* (2011.01)
*G01N 17/00* (2006.01)
*G01N 25/00* (2006.01)
*G01M 15/02* (2006.01)
*G01M 15/14* (2006.01)

(52) U.S. Cl. .................... 73/865.6; 73/112.01

(58) Field of Classification Search ............ 73/112.01, 73/118.01–118.02, 865.6, 865.9, 866
See application file for complete search history.

(56) References Cited

U.S. PATENT DOCUMENTS

| 3,406,863 | A | * | 10/1968 | Wenzel et al. | 220/201 |
| 3,498,493 | A | * | 3/1970 | Kemp | 220/325 |
| 3,647,108 | A | * | 3/1972 | Kemp | 220/240 |
| 4,425,963 | A | * | 1/1984 | Scholz et al. | 165/104.32 |
| 4,801,423 | A | * | 1/1989 | Warren et al. | 376/287 |
| 6,962,643 | B2 | * | 11/2005 | Kondo et al. | 156/329 |

FOREIGN PATENT DOCUMENTS

SU 1687968 A1 * 10/1991

* cited by examiner

*Primary Examiner* — Thomas P Noland
(74) *Attorney, Agent, or Firm* — John Ryznic

(57) ABSTRACT

A pressure vessel test rig for testing a component under high pressure and temperature, the pressure vessel having a flange with an opening so that instrumentation lines can pass from inside the vessel to outside, and a sealing plate with grooves that provide a seal for the instrumentation lines when a cover plate is secured to the flange. A removable instrumentation hold-down tool is attached to the flange and includes a number of spring biased clamps that secure the instrumentation lines to the flange during changes to the component within the vessel.

6 Claims, 7 Drawing Sheets

Section A-A

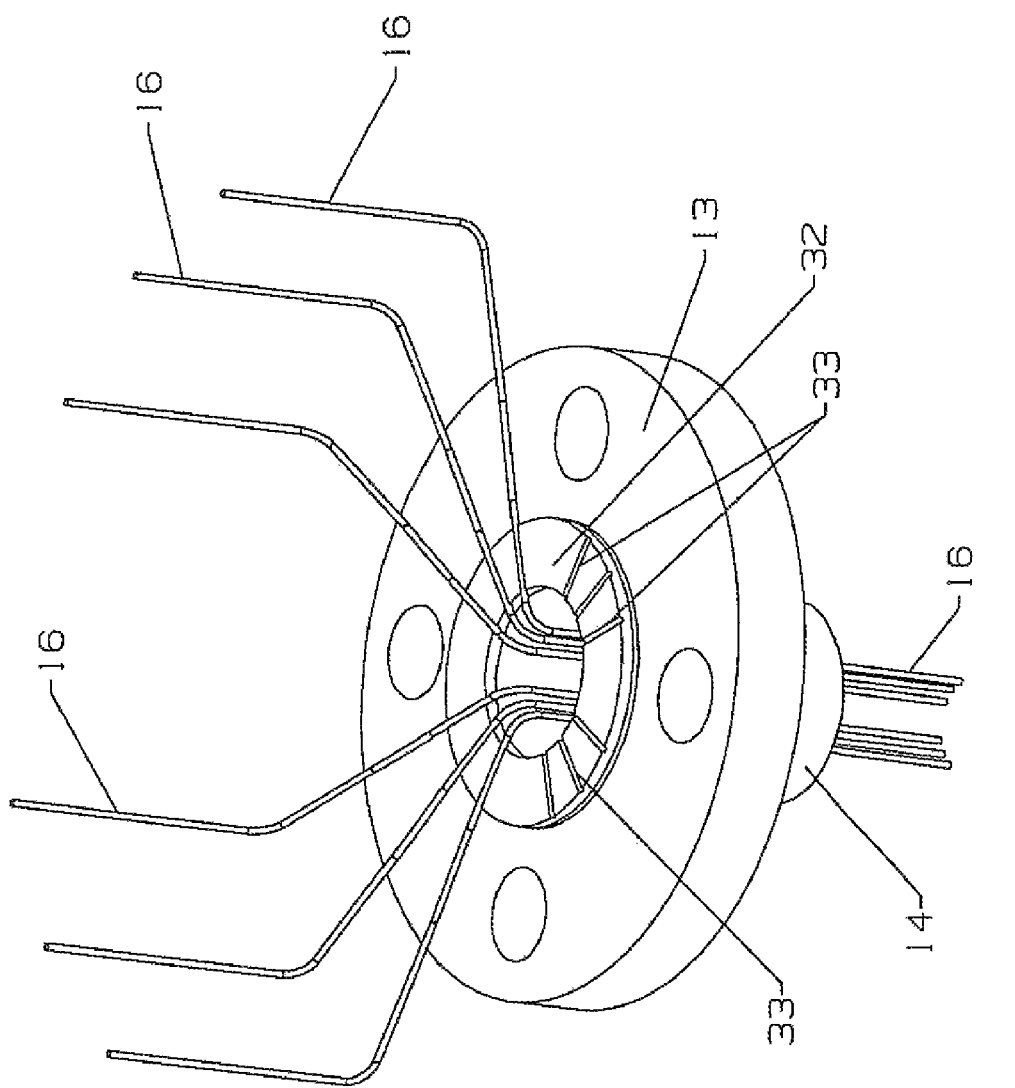

INSTRUMENTATION INSTALLATION TOOL FOR A PRESSURE VESSEL TEST RIG

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a combustor test rig, and more specifically to combustor test rig with instrumentation lines for monitoring the testing.

2. Description of the Related Art Including Information Disclosed Under 37 CFR 1.97 and 1.98

A combustor, for example that used in a gas turbine engine, burns a fuel with a compressed air to produce a high temperature and pressure gas flow that is passed through a turbine to drive the compressor and to produce external power such as to power an aircraft or to drive an electric generator in an industrial gas turbine (IGT) engine. Combustor designs are tested on a test rig to determine performance and endurance, among other design features. It is also very expensive to test a combustor on these test rigs. There are few places in the world that have combustor testing facilities, and these test facilities cost up to tens of thousands of dollars per day to use. Thus, any time that is used for installation and disassembly of the testing equipment requires extra time spent in the testing facility in which no actual testing of the combustor is being performed.

Although this invention is geared toward a combustor test rig, it also applies to any hardware that needs to be tested in a pressure vessel with protruding instrumentation lines required.

When the test combustor or associated hardware has to be temporarily removed from the test rig for repairs, modifications or replacement, the instrumentation end connectors must be cut off so the instrumentation lines can pass thru the fittings. After modification or repair has been completed and the combustor hardware is re-installed into the test rig, the instrumentation line installation must be repeated. The instrumentation lines must be passed thru fittings, the fittings sealed and then the end connectors re-attached to the instrumentation lines. Since there can be several dozens of these instrumentation lines required for a combustor test rig, the re-installation of the instrumentation lines can become very expensive in terms of the skilled labor costs required to attach the connectors and the expensive downtime of the test cell being used to conduct the rig test.

Instrumentation permanently installed on the test combustor and the associated hardware must be able to pass thru the pressure vessel wall without any leakage. The instrumentation is typically a hollow metal tube (for measuring pressure) or a metal sheathing with internal wire leads (for measuring temperature or vibration, etc.). Standard sealed instrumentation fittings typically have holes the same size as the instrumentation lines outside diameters and a sealing material that seals the instrumentation lines when the fittings are tightened. After the instrumentation lines are passed thru the fittings, their end connectors are attached for connection to data recording devices or instrumentation extension lines.

When installing multiple instrumentation lines thru a flanged hole in the testing pressure vessel, it is difficult to keep the lines from moving. This is due to the instrumentation lines being light in weight and having a spring-back effect when moved, and the fact that they bump into each other as each line is being manipulated into position.

BRIEF SUMMARY OF THE INVENTION

It is an object of the present invention to provide for a combustor test rig in which the instrumentation lines can be easily removed and replaced in order to shorten the time between testing the combustor.

It is another object of the present invention to provide for a combustor test rig in which instrumentation lines are held in place during the flange installation process in order that a single person can re-install the instrumentation lines.

It is another object of the present invention to provide for a combustor test rig that is less costly to run than prior art combustor test rigs.

These objectives and more can be achieved by the apparatus and process for testing a combustor in a test rig by installing a test combustor and associated hardware inside of a sealed cylindrical pressure vessel to contain the required high temperature and high pressure air flow. The test rig of the present invention includes a standard flange welded to the pressure vessel along with a standard bolted cover plate. Two identical Grafoil® seals are placed between the flange and the cover plate so that the instrumentation lines are trapped between the seals when the cover plate is bolted to the flange. Upon tightening the flange bolts, the instrumentation lines get embedded between the seals to prevent leakage.

When the combustor or associated test hardware needs to be temporarily removed, the bolted flange cover plate is removed and the instrumentation lines are simply unplugged from the data recording devices and pulled thru the flange opening without removing the instrumentation connectors. After the repairs, modifications or replacement of the combustor or test item has been performed, the test hardware is simply re-installed with the instrumentation lines passing thru the flanged openings and re-plugged back in to the data recording devices.

To allow for a single person to re-install the instrumentation lines on the test rig, a clam shell tool is used around the outside diameter of the flange and bolted together with clips and held in place by thumbscrews.

The clam shell plate supports a spring biased clamp for each instrumentation line to hold the lines in place during re-installation of all the instrumentation lines.

As each instrumentation line is held in place by the tool, the upper seal and flange cover are installed. Then, the bolts are installed and tightened to complete the installation.

BRIEF DESCRIPTION OF THE SEVERAL VIEWS OF THE DRAWINGS

FIG. 8 shows a schematic view of the flange with the cover, top seal and some instrumentation lines removed. Some of the grooves formed by bolting the cover on and compressing the seals against the instrumentation lines are also shown.

DETAILED DESCRIPTION OF THE INVENTION

Figure 1:
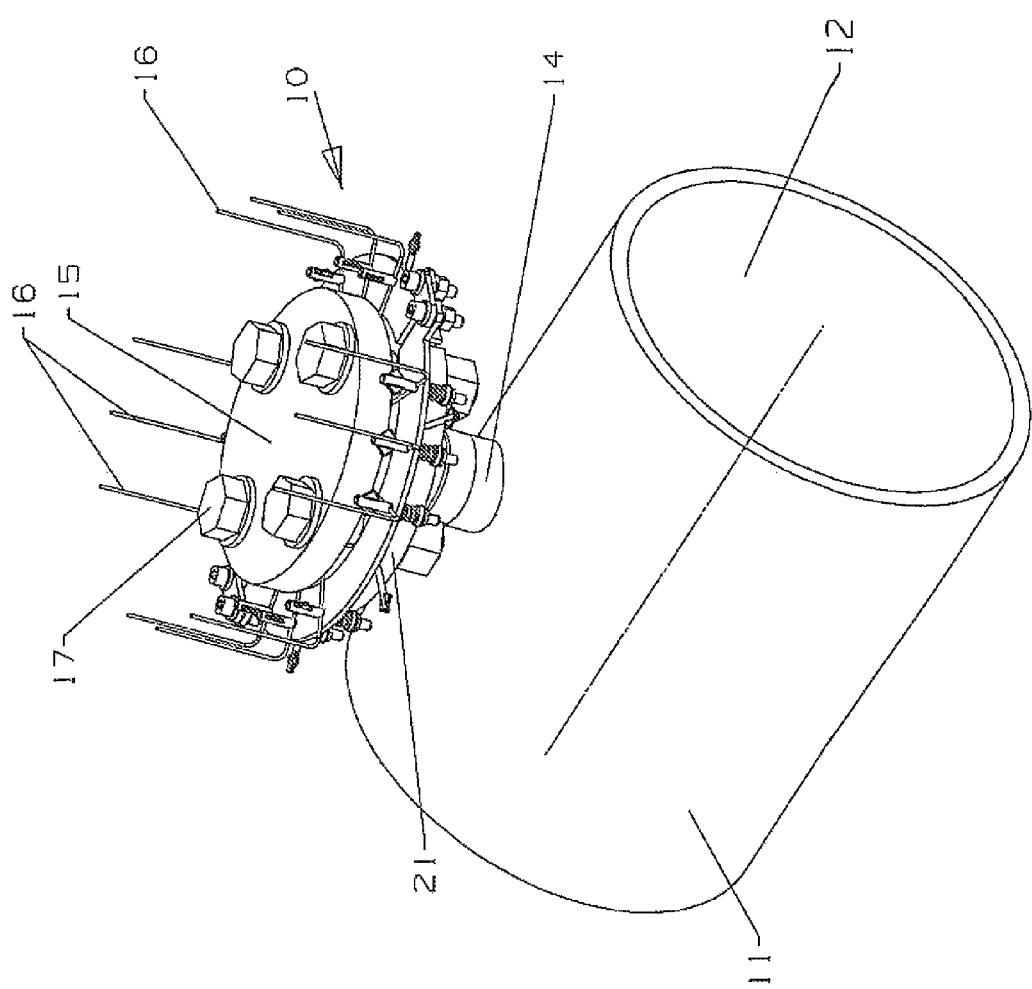
FIG. 1 shows a schematic view of the sealed instrumentation flange with the installation tool installed on a test rig pressure vessel of the present invention.

The present invention is a test rig instrumentation installation tool for use with a combustor test rig for testing different combustor configurations. FIG. 1 shows the instrumentation installation tool assembly 10 mounted on the combustor test rig and includes a combustor rig pressure vessel 11 with a hollow interior 12 for the combustor test article. There are typically flanges at each end of the test section (not shown) and the combustor test article is installed thru either end of the test section after disconnecting the test section from the rest of the upstream and downstream sections of the test rig (not shown).

Figure 2:
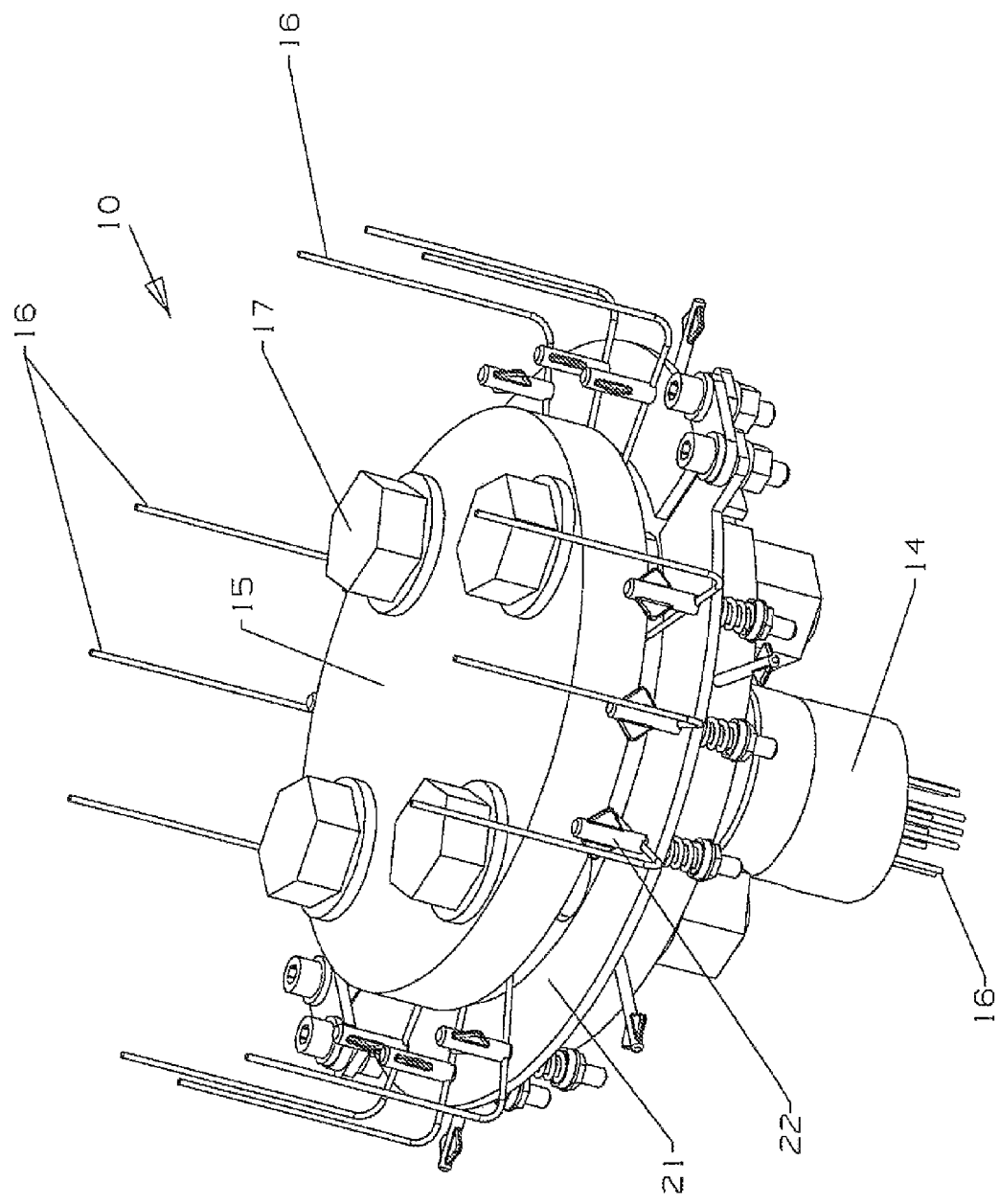
FIG. 2 shows a close-up of the sealed instrumentation flange with the installation tool installed.

An instrumentation flange 13 is secured and sealed to a hollow cylinder 14 that is welded to the pressure vessel 11 with a hole in the pressure vessel 11 so that the instrumentation lines 16 can pass through. The instrumentation lines 16 can be hollow metal tubing for measuring pressure or a metal sheathing with internal wires for measuring temperature or vibration. A number of bolts 17 secure a cover plate 15 the flange to clamp two seals and the instrumentation lines 16 in place as described below. FIG. 2 shows a close-up view of the instrumentation installation tool 10 with the instrumentation lines extending from below the hollow cylinder 14 and out from the sides of the flange 13 and cover plate 15. An installation hold-down tool bracket 21 with a number of spring biased clamps 22 are used for each of the instrumentation lines extending along the flange and cover plate to hold the individual lines down during assembly and disassembly of the remaining instrumentation lines.

Figure 3:
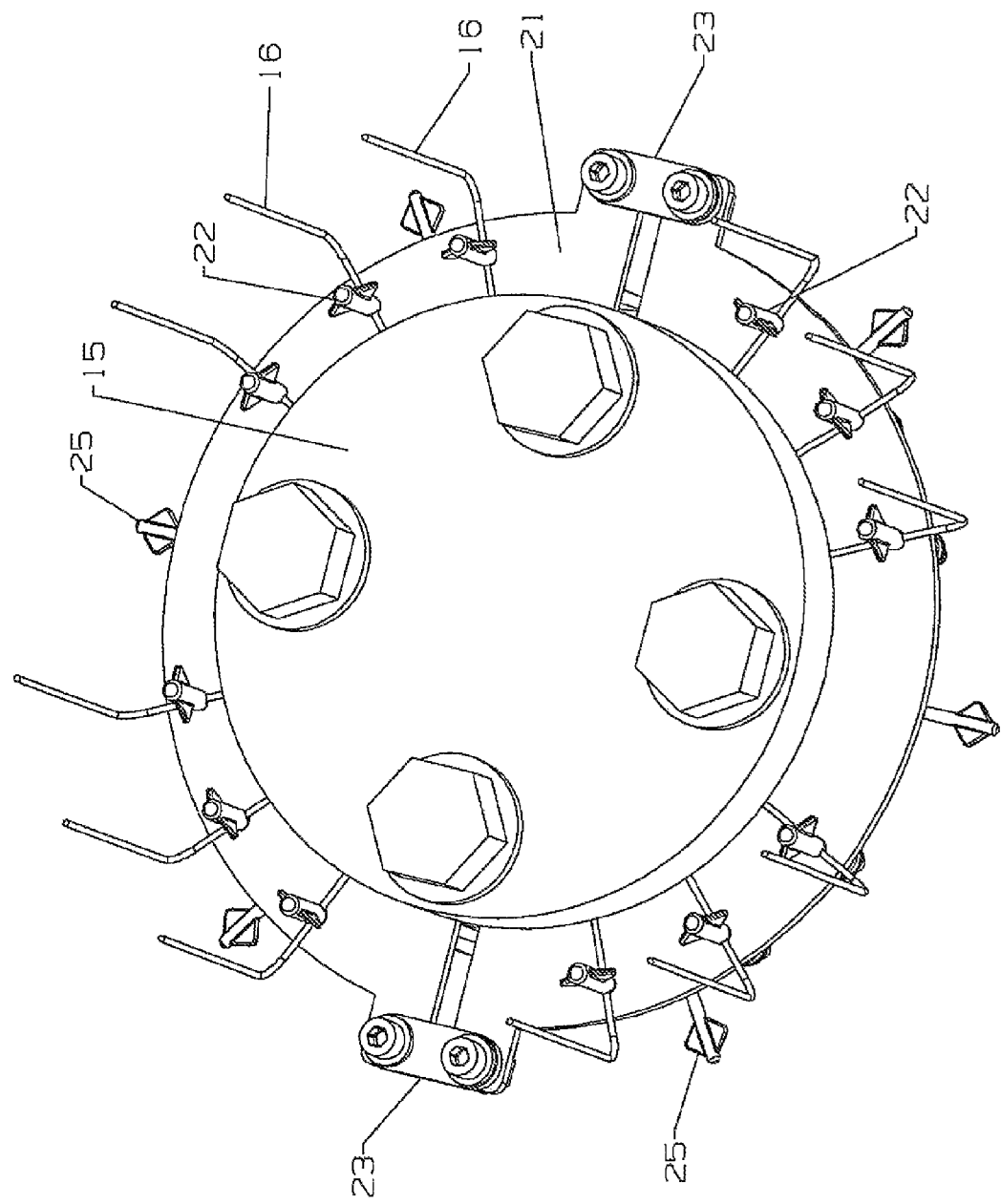
FIG. 3 shows a top looking view of the sealed instrumentation flange with the installation tool installed.
Figure 4:
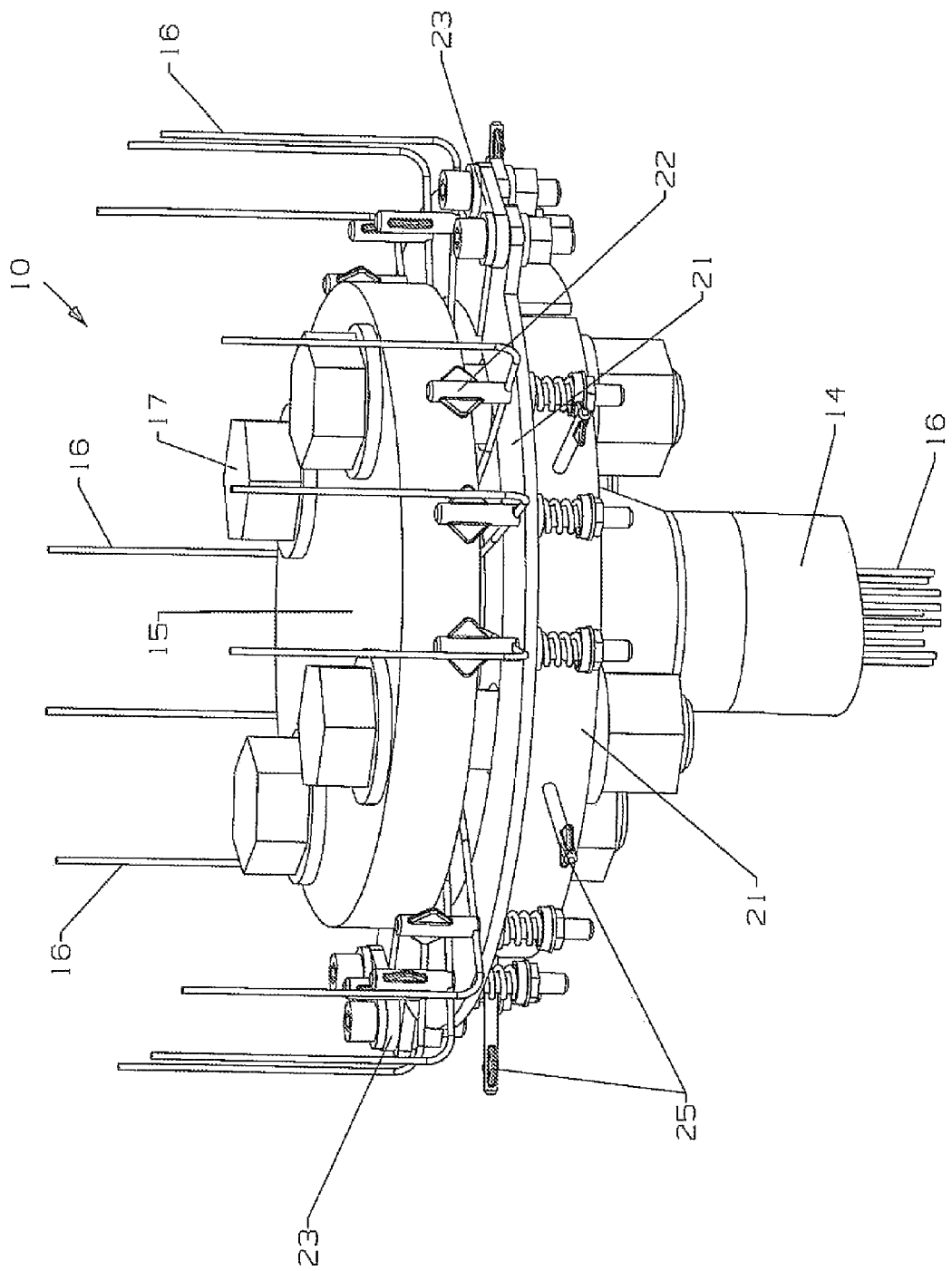
FIG. 4 shows a schematic side view of the sealed instrumentation flange with the installation tool installed. Also shown are the instrumentation lines clamped between the two seals.
Figure 5:
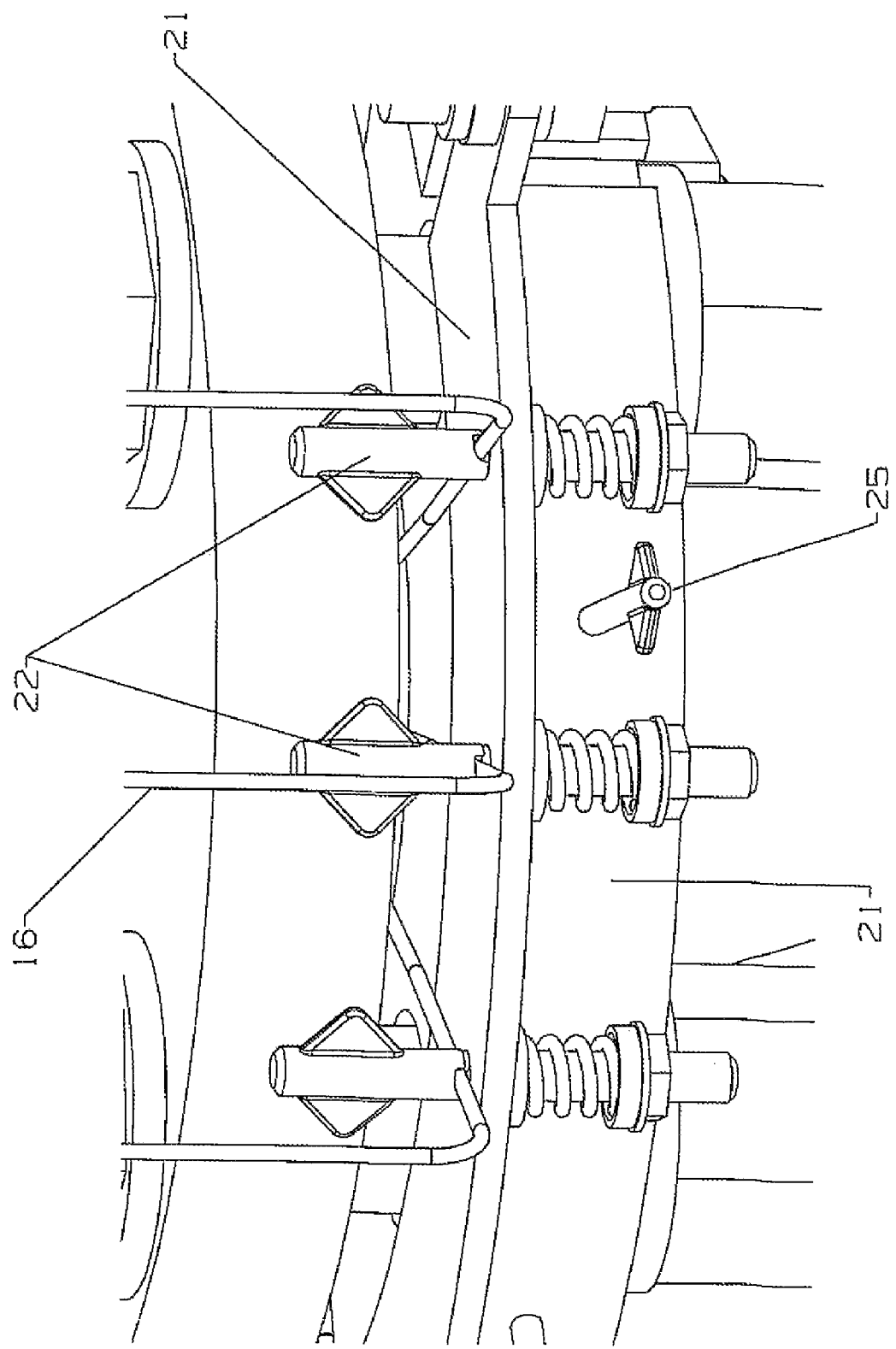
FIG. 5 shows a schematic view for some of the spring biased clamps that hold the instrumentation lines in place during changes to the test rig.

The installation hold-down bracket 21 is formed of two 180 degree pieces as seen in FIG. 3 that are pivotally connected together by two clips that are bottled together as seen in FIG. 3. Each side of the installation tool hold-down bracket 21 is supported by an upper and lower clip to form the installation bracket assembly 23. The installation bracket 21 supports the spring biased instrumentation line clamps 22. A number of set screws 25 are located around the instrumentation flange 13 to tighten the installation bracket 21 against the flange 13. FIG. 4 shows a side view of the instrumentation installation bracket assembly 10 with the installation hold-down bracket and the set screws 25 secured to the flange 13 with several of the instrumentation lines 16 running through the assembly and clamped onto the installation hold-down bracket 21 by the clamps 22. FIG. 5 shows a detailed view of three of the clamps 22 with the set screws 25 securing the instrumentation bracket 21 to the flange 13 and the instrumentation lines extending through the assembly and clamped to the instrumentation bracket 21 by the clamps 22.

Figure 6:
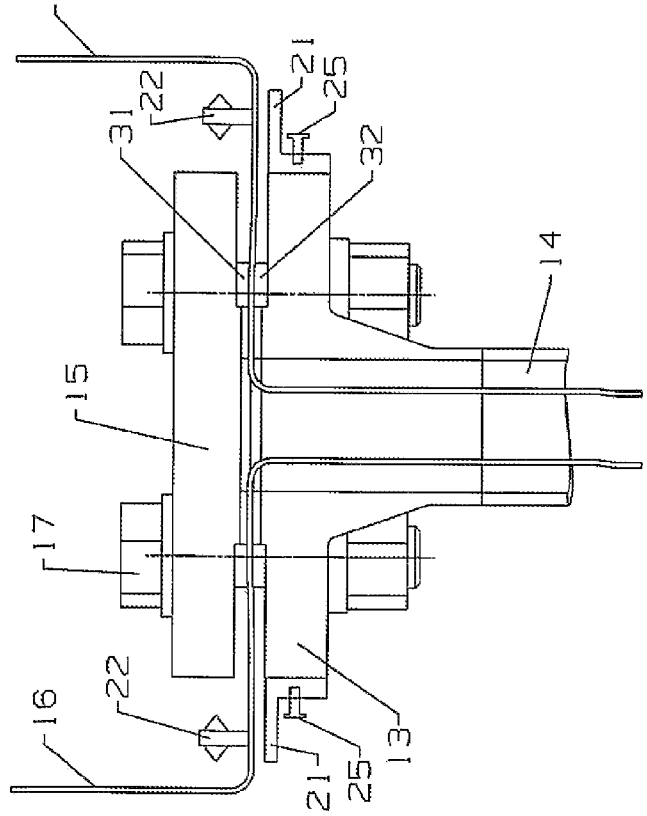
FIG. 6 shows a cross section side view of the flange and cover plate bolted together with the instrumentation lines passing through the grooves formed between the two seals.

FIG. 6 shows a cross section view of the cover plate 15 bolted to the flange 13 with two seals 31 and 32 clamped between them to secure and seal the instrumentation lines 16. The two seals 31 and 32 are both fully annular and soft enough to have radial extending grooves formed on the sides that face to the opposite sealing plate after bolting the cover plate 15 to the flange 13. This ensures that the instrumentation lines 16 are properly sealed.

Figure 7:
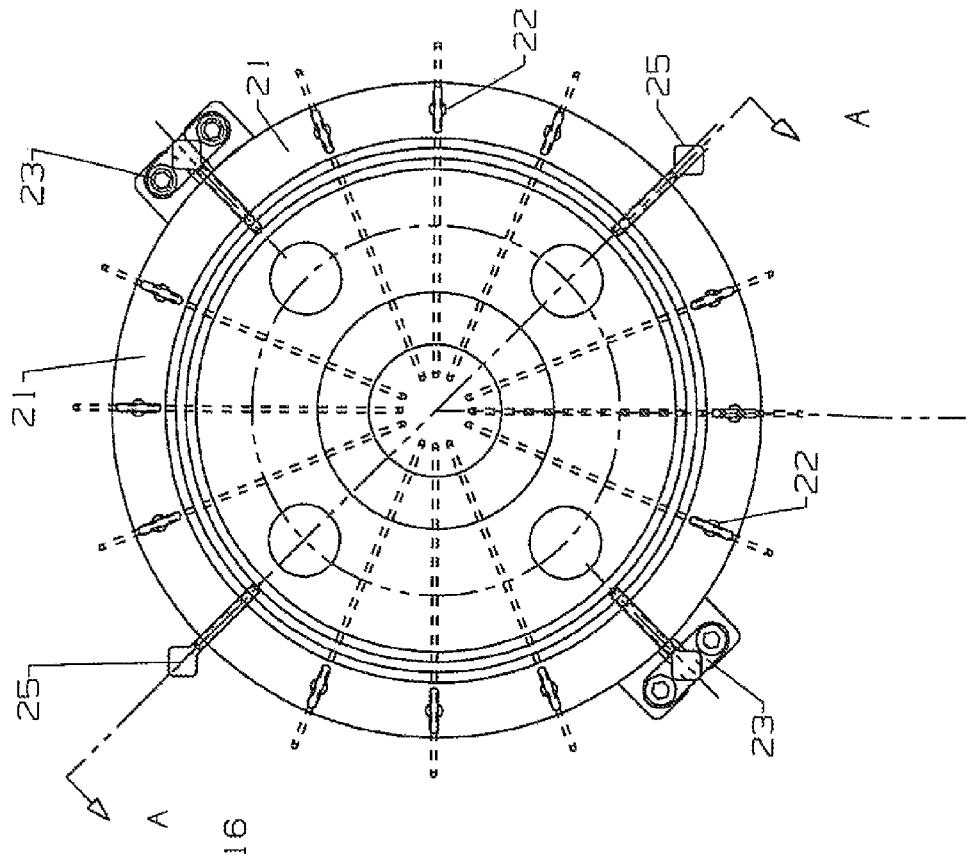
FIG. 7 shows a top view of the cover and the radial extending instrumentation lines.

FIG. 7 shows a top view of the installation bracket 21 with the instrumentation line path radiating out from the center and extending beyond the perimeter of the bracket 22, and an arrangement of the installation brackets 23, the set screws 25 and the clamps 22 on the installation bracket 21.

FIG. 8 shows the flange 13 with the lower seals 32 in position and having a number of the instrumentation lines 16 extending out from the center. The radial extending grooves formed within the seals 32 are shown without their respective instrumentation lines. The seals 31 and 32 secure the instrumentation lines between the flange 13 and cover plate 15 to prevent leakage from the pressure vessel during testing.

Operation of the test rig with the instrumentation installation bracket assembly 10 is described below. A combustor is secured in place within the hollow section 12 of the pressure vessel 11 with several probes connected to the combustor and the instrumentation lines extending out from the probes. A connector is placed on the ends of each instrumentation line and must be located outside of the pressure vessel during operation of the test rig. This is because the connectors cannot survive the high temperatures inside of the pressure vessel. The connectors are in turn connected to data recording devices for to extension lines that are connected to data recording devices).

The instrumentation hold-down bracket 21 with the line clamps 22 is secured to the flange 13 by using one set of clips as a pivot and then using the second set of clips to hold both ends of the bracket together around the flange 13. The set screws 25 are then tightened against the flange 13 to secure the bracket assay 21 in place.

The instrumentation with the connectors attached are passed through the hollow cylinder 14 and through the opening in the flange 13 (bidden by the instrumentation hold-down bracket 21) and over the lower seal 32, which has previously been placed onto the flat surface of the flange 13.

The instrumentation lines are each then held in place by the line clamps 22 to secure them in place one at a time.

When all of the instrumentation lines 16 have been clamped in place over the lower seal 32, the outer seal 31 is placed onto the instrumentation lines and the cover plate 15 is bolted onto the flange 13 to squeeze the two seals against the instrumentation lines 16.

This squeezing together of the seals over the instrumentation lines forms grooves in the soft seals which aids sealing of the high temperature and pressure gas inside of the pressure vessel 11.

When new hardware or a modification are to be made to the combustor, the instrumentation lines are unplugged from the data recording devices and then released from the clamps 22 on the instrumentation installation tool assembly 10.

The cover plate 15 is then unbolted and removed along with the upper seal 31.

The combustor is then un-attached from the inside of the pressure vessel and removed from the test section of the rig while feeding all the instrumentation lines through the flange 13 welded to the test section of the rig 11.

This allows the combustor to be removed with all its instrumentation lines and connects intact. This eliminates the current time consuming practice of cutting the connectors off and then splicing new ones on after re-installing the combustor in the rig.

After the modification or replacement of the combustor has been performed, the instrumentation lines are then fed thru the welded flange 13 as the combustor is installed back into the test section of the rig. The flange is sealed as described above, and the instrumentation connectors are simply plugged back into their respective data recording devices.

I claim the following:

1. A test rig for monitoring a condition of a test article during testing, the test rig comprising:

a pressure vessel to secure the test article within during the testing;

a flange secured to the pressure vessel with an opening to allow for instrumentation lines to pass from inside the pressure vessel to outside the pressure vessel;

a cover plate bolted to the flange;

an upper seal and a lower seal secured between the flange and the cover plate; and, an upper and lower seal soft enough to form sealing grooves when compressed against instrumentation lines by the cover plate bolts.

2. The test rig of claim 1, and further comprising:

an instrumentation hold-down tool removably secured to the flange and having a plurality of spring biased clamps to hold down the instrumentation lines.

3. The test rig of claim 2, and further comprising:

the instrumentation hold-down tool includes a plurality of set screws to tighten the instrumentation hold-down bracket to the flange.

4. An instrumentation hold-down tool for use on a pressure vessel test rig to secure a plurality of instrumentation lines, the hold-down tool comprising:

first and second bracket halves pivotally secured together on one end;

the first and second bracket halves both having an annular inner side sized and shaped to fit around a circular flange of the pressure vessel test rig; and, a plurality of spring biased instrumentation line clamps on a top surface of the first and second bracket halves.

5. The instrumentation hold-down bracket of claim 4, and further comprising:

the first and second bracket halves are pivotally secured together on both ends by a pivoting clips bolted to the first and second bracket halves.

6. The instrumentation hold-down bracket of claim 4, and further comprising:

a plurality of set screws aligned to move toward a radial center of the hold-down bracket to tighten the hold-down bracket onto the flange of the test rig.

* * * * *

UNITED STATES PATENT AND TRADEMARK OFFICE
CERTIFICATE OF CORRECTION

| | | |
|---|---|---|
| PATENT NO. | : 8,109,159 B1 | Page 1 of 1 |
| APPLICATION NO. | : 12/489765 | |
| DATED | : February 7, 2012 | |
| INVENTOR(S) | : John A Carella | |

It is certified that error appears in the above-identified patent and that said Letters Patent is hereby corrected as shown below:

Title page, item [73] assignee, should read – Florida Turbine Technologies, Inc.

Signed and Sealed this
Thirteenth Day of March, 2012

David J. Kappos
*Director of the United States Patent and Trademark Office*